United States Patent [19]

Hughes

[11] Patent Number: 4,468,723
[45] Date of Patent: Aug. 28, 1984

[54] MAGNETICALLY REGULATED POWER SUPPLY

[75] Inventor: William L. Hughes, Hackettstown, N.J.

[73] Assignee: Hewlett-Packard Company, Palo Alto, Calif.

[21] Appl. No.: 470,341

[22] Filed: Mar. 3, 1983

Related U.S. Application Data

[63] Continuation of Ser. No. 257,017, Apr. 24, 1981, abandoned.

[51] Int. Cl.³ .............................................. H02P 13/12
[52] U.S. Cl. ........................................ 363/82; 363/15; 363/90
[58] Field of Search ..................................... 363/19–21, 363/75, 82, 90, 93, 101, 15, 16; 323/247, 249, 254, 259, 261, 263, 339, 344

[56] References Cited

U.S. PATENT DOCUMENTS

| | | | |
|---|---|---|---|
| 3,109,133 | 10/1963 | Mills | 363/17 |
| 3,596,172 | 6/1969 | Harrison | 323/263 |
| 3,818,306 | 6/1974 | Marini | 363/15 |
| 3,863,140 | 1/1975 | Easter et al. | 363/15 |
| 4,302,805 | 11/1981 | Marez et al. | 323/259 |

FOREIGN PATENT DOCUMENTS

| | | | |
|---|---|---|---|
| 2429433 | 1/1976 | Fed. Rep. of Germany | 323/263 |
| 32534 | 3/1977 | Japan | 363/101 |

Primary Examiner—William H. Beha, Jr.
Attorney, Agent, or Firm—Donald N. Timbie

[57] ABSTRACT

Apparatus is disclosed for controlling the regulating inductance of a power supply by applying across a control winding mounted on the same core a voltage having a volt-second product proportional to the difference between a desired output voltage and the actual output voltage so that the frequency of response is the same under all operating conditions. In a preferred form, the apparatus is incorporated in a power supply having a source of DC pulses that are rectified to produce the output voltage and the volt-second product of the voltage applied across the control winding is proportional to the difference between the detected value of said pulses and a control voltage that is related to the difference between the actual output voltage and the desired value.

2 Claims, 17 Drawing Figures

OUTPUT $U_3$ + BASE OF 44

VOLTAGE AT COLLECTOR TRANSISTOR 44

CURRENT IN $L_{CA}$ AND $L_{CB}$

VOLTAGE AT CATHODE OF DIODE 46

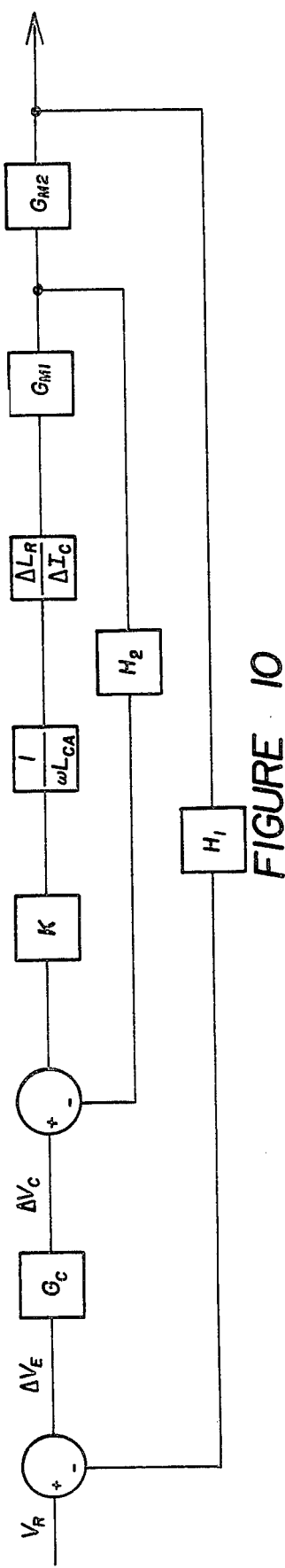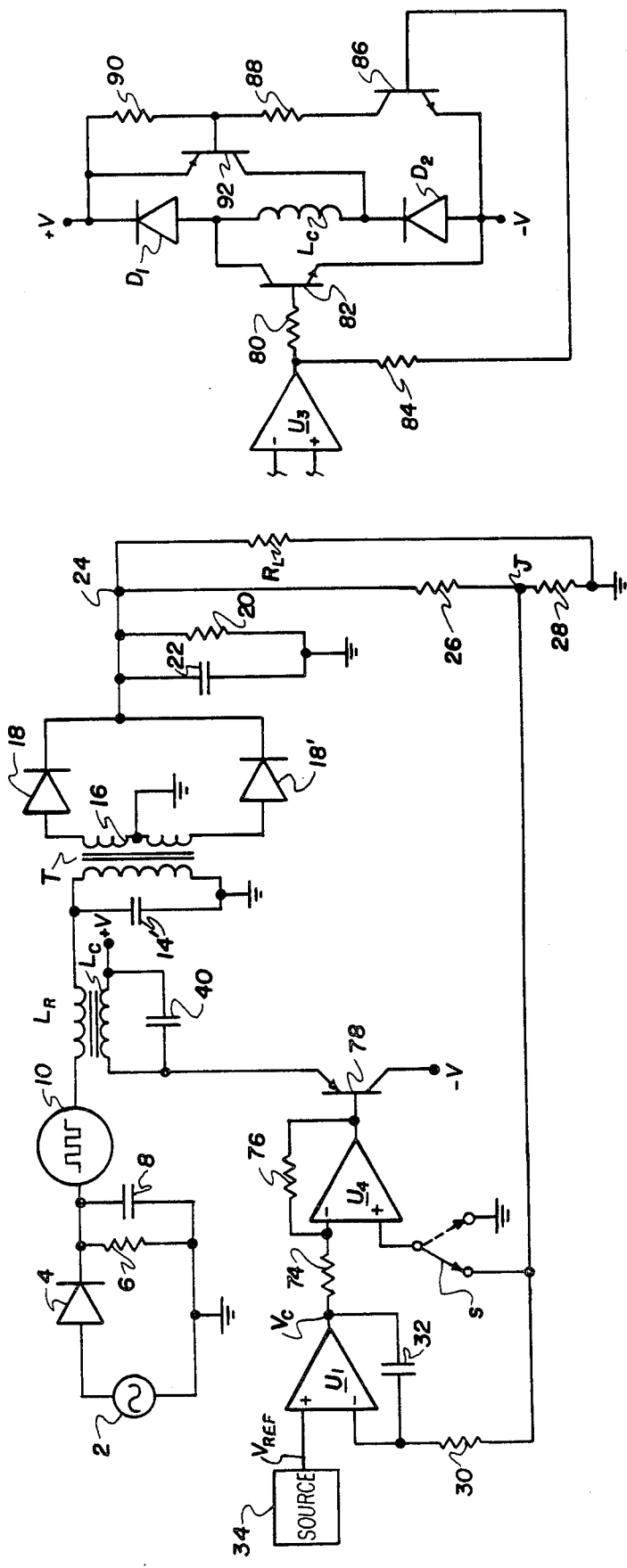
FIGURE 10
FIGURE 11
FIGURE 12

MAGNETICALLY REGULATED POWER SUPPLY

This is a continuation of application Ser. No. 06/257,017, filed Apr. 24, 1981, now abandoned.

BACKGROUND OF THE INVENTION

This invention relates to improvements in power supplies that regulate the output voltage and/or current by controlling the inductance of a regulating inductor $L_R$ whether or not the inductor is in the path of the load current. In the prior art, the inductance of the regulating inductor $L_R$ has been adjusted by conducting current $I_C$ through a control winding $L_C$ that is mounted on the same core so as to change the permeability of the core. The current $I_C$ is generally provided by a current source that is controlled by the difference between a desired output voltage or current and the actual value. If the inductance of $L_R$ is to be large, $I_C$ is made small so as to bias the core at a point on its hysteresis curve having substantial slope and make the incremental inductance of $L_R$ large; and if the inductance of $L_R$ is to be small, $I_C$ is made large so as to bias the core at a point on its hysteresis curve having a low slope and make the incremental inductance of $L_R$ low. The gain of the servo loop just described includes a factor $\Delta L_R/\Delta I_C$ which is proportional to the slope of the hysteresis curve at the operating point, and between extreme operating conditions the slope and gain can vary as much as 20 db. Inasmuch as the frequency at which the power supply can respond to fluctuations in line voltage or load is proportional to the gain, it can vary from a low to a high value, but the specified frequency of response of the power supply is the lower value.

Power supplies often have a pulsating DC current flowing through the regulating inductor $L_R$ which is unavoidably coupled to the control winding $L_C$ through the common core. The energy so coupled cannot be dissipated through the current source providing the current $I_C$ to the control winding because of its high impedance. Therefore, it has been customary to connect a capacitor in shunt with the control winding $L_C$ to provide a current path. Even with the best of circuit designs, the parallel resonant frequency of this capacitor and the control winding $L_C$ is so low as to limit the specified frequency response of the power supply to an even lower value. The reasons for this will be explained in connection with the drawings of such a prior art system.

Power supplies of the prior art also have a number of other problems. The source of the bias current $I_C$ is normally biased in a linear region so as to waste power and the noise rejection is generally poor. Furthermore, variations of the parameters of certain components can cause the frequency response of one power supply to differ significantly from the frequency response of another.

BRIEF DESCRIPTION OF THE INVENTION

Although this invention will be illustrated in connection with a power supply in which the regulating inductor is traversed by current generally corresponding to the output current, it is to be understood that it can be used to advantage in any situation where it is desired to exercise control by changing the inductance of an inductor by means of current through a control winding so as to vary the permeability of a common core. By way of example, it could be used to control the current in the control winding 18 of U.S. Pat. No. 3,109,133.

In accordance with one aspect of this invention, the current through the control winding is controlled by a drive circuit that applies a voltage across the control winding having a net voltage-time product proportional to the current $I_C$ that is desired. The voltage across the control winding can be pulsed or continuous. With such a drive circuit, the gain also includes a factor of $1/\omega L_C$, wherein $L_C$ is the inductance of the control winding. Since $L_C$ also varies with the slope of the hysteresis curve, it cancels the effect of the gain factor $\Delta L_R/\Delta I_C$ so that the frequency of response of the power supply is substantially unaffected by differences in operating conditions.

In accordance with another aspect of this invention, the invention is applied to a power supply having a source of unregulated pulsed DC voltage coupled to an output transformer via the regulating inductor $L_R$. Means are provided for applying a voltage across the control winding $L_C$ that has a voltage-time product proportional to the difference between the demodulated voltage across the transformer or the current flowing in it and a control signal related to the respective difference between a desired output voltage or current and the actual output voltage or current. Thus, in effect, two servo loops are formed, an inner loop including the circuit for feedback of the demodulated voltage or current to the means for applying voltage across the control winding $L_C$, and an outer loop including the circuit for deriving the control signal and feeding it to the means for applying voltage across the control winding. In effect, the outer loop is completed by or acts through the inner loop. The addition of the inner loop improves the signal-to-noise ratio of the power supply and causes the frequency response of the supply to remain substantially the same for all power supplies even though the values of certain components in the inner loop may vary from supply to supply.

In the circuit just described, the voltage applied across the control winding can be pulsed or continuous, but if it is pulsed, it is preferable in accordance with another aspect of this invention to synchronize the pulses with the pulses of unregulated DC voltage. A pulse width modulator may be used to apply the pulses of voltage across the control winding.

Because voltage across the control winding can be provided by a voltage source having a low impedance, it is unnecessary to provide a capacitor in shunt with the control winding, and this permits the specified frequency of response of the power supply to be higher.

BRIEF DESCRIPTION OF THE DRAWINGS

FIG. 10 is a block diagram illustrating the factors affecting gain in the power supply of FIG. 9;

FIG. 11 schematically illustrates a power supply wherein the voltage applied across the control winding continually varies with the difference between the desired output voltage of the power supply and the actual output voltage, and wherein the gain of the inner loop is unity; and FIG. 12 schematically illustrates another circuit for applying rectangular voltages across the control winding.

DETAILED DESCRIPTION OF THE PRIOR ART

In discussing the drawings related to prior art and the embodiments of the invention, all components performing corresponding functions will be designated in the same manner.

Figures 1, 2:
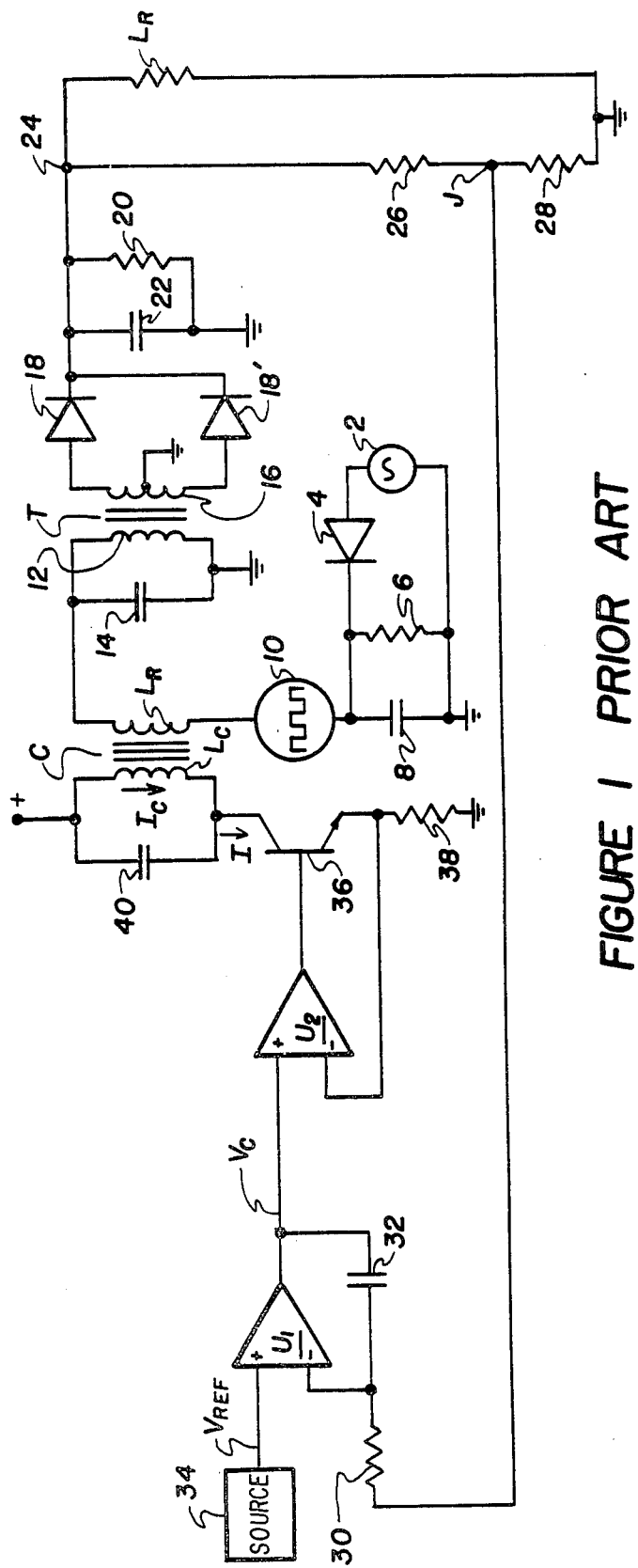
FIG. 1 is a schematic illustration of a power supply of the prior art.
FIG. 2 is a block diagram illustrating the factors affecting gain of the prior art power supply of FIG. 1.

FIG. 1 illustrates a switching type power supply of the prior art wherein a source 2 of alternating voltage such as provided by a power line is connected by a diode 4 to a filter comprised of a resistor 6 connected in parallel with a capacitor 8 so as to produce an unregulated direct current voltage at the ungrounded end of the capacitor 8. A chopper 10, a regulating inductor $L_R$ that is mounted on a core C, and a primary winding 12 of an output transformer T are connected in series with the capacitor 8, and the primary winding 12 is tuned to resonate by a shunt capacitor 14 at the frequency, e.g., 40 kHz, at which the chopper 10 interrupts the circuit. Opposite ends of a secondary winding 16 of the transformer T are respectively connected by diodes 18 and 18' to a filter comprised of a resistor 20 connected in parallel with a capacitor 22 so as to produce a DC voltage at an output terminal 24. The center of the secondary winding 16 is connected to ground.

Regulation is achieved by the following circuitry. Resistors 26 and 28 are connected in series between the output terminal 24 and ground so as to produce at their junction J a reduced monitor voltage that varies with the output voltage of the supply. The monitor voltage is conducted via a resistor 30 to the inverting input of a differential amplifier $U_1$ that is made to perform an integrating function by connection of a capacitor 32 between its inverting input and its output. A source 34 supplies reference voltage $V_{REF}$ to the non-inverting input of $U_1$ that is the same fraction of a desired output voltage as the monitor voltage at the junction J is of the actual output voltage at the output terminal 24. The actual difference between $V_{REF}$ and the monitor voltage at the junction J is the true error voltage but is transformed by the frequency roll-off of the integrating circuit coupled to $U_1$ into a control voltage $V_C$.

A voltage-to-current converter is provided that is comprised of a differential amplifier $U_2$, an NPN transistor 36 and a resistor 38. The non-inverting input of $U_2$ is connected to the output of $U_1$; the inverting input is connected to the emitter of the transistor 36; the output is connected to the base of the transistor 36; and the resistor 38 is connected between the emitter of the transistor 36 and ground. The collector of the transistor 36 is connected via a control inductor $L_C$ to a point of suitable positive potential. Given that the gain of $U_2$ is high, both of its inputs will be at the control voltage $V_C$, and if $\beta$, $i_C/i_B$, of the transistor 36 is also high, a current I will be forced to flow through the collector equal to $V_C/R_{38}$. A capacitor 40 is connected in shunt with $L_C$ in order to dissipate the energy of chopper frequency that is unavoidably coupled into $L_C$. Thus, the portion $I_C$ of the current I that flows through the control winding $L_C$ is $V_C/R_{38}(\omega^2 L_C C+1)$ wherein $\omega$ is the frequency of $V_C$, C is the capacitance of the capacitor 40, and $R_{38}$ is the resistance of the resistor 38.

Figure 4:
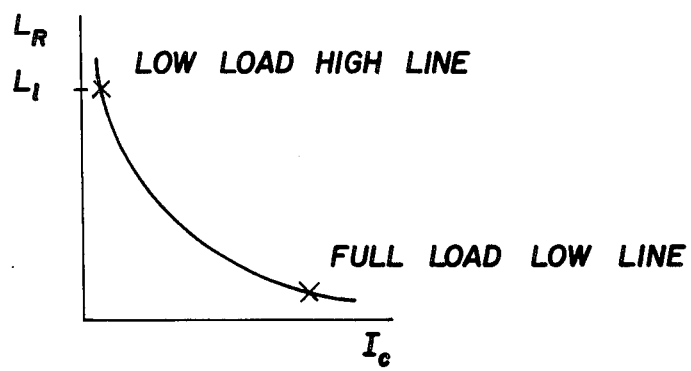
FIG. 4 is a graph illustrating the variation of the inductance of the regulating winding of FIG. 1 with the current through the control winding.
Figure 5:
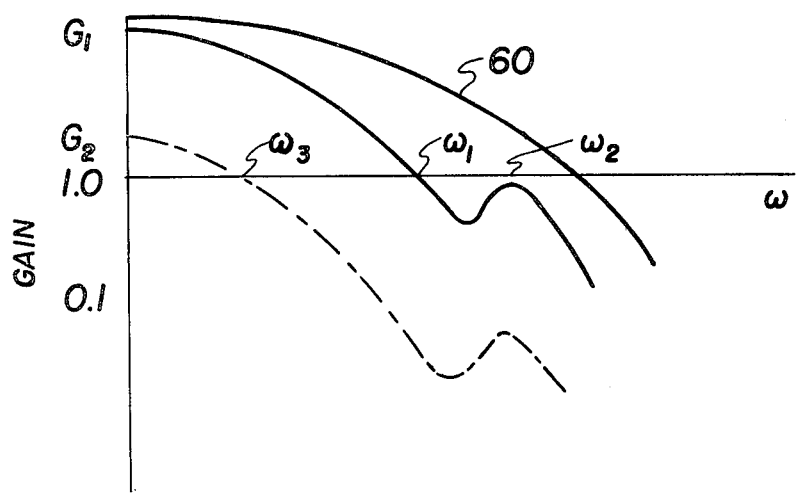
FIG. 5 is a graph illustrating the gain characteristics of the power supply of FIG. 1, as well as of a power supply of FIGS. 6 and 9.

FIG. 2 is a block diagram illustrating the gain factor of the servo loop of the prior art power supply illustrated in FIG. 1. The letter "A" represents the gain and subtraction performed within $U_1$ to produce an error signal $\Delta V_E$; $G_C$ represents the frequency compensation effected by the integration to produce a control signal $\Delta V_C$; $1/R(\omega^2 L_C C+1)$ represents the conversion of $\Delta V_C$ into $\Delta I_C$; $\Delta L_R/\Delta I_C$ speaks for itself; and $G_M$ symbolizes the arbitrary power mesh transfer function which transforms $L_R$ into an output voltage. Because $\Delta L_R/\Delta I_C$ has different values under different operating conditions, the gain of the servo loop changes. Assume, for example, that the line voltage, herein shown as being supplied by the source 2, is at its maximum value and that there is no load. Under this condition, the unregulated voltage at the output terminal would be high so that the voltage at the junction J would be greater than $V_{REF}$ would cause a reduction in $I_C$. As shown in the hysteresis curve of FIG. 3, the operating point of the magnetic core C would be at a point such as $P_1$ which has a maximum slope. The incremental inductance of $L_R$ has a maximum value $L_1$, as indicated in FIG. 4, so as to drop the voltage of chopper frequency and reduce the output voltage to a value corresponding to, $V_{REF}$. Under this condition, any change in the output voltage produces a maximum change in the inductance of $L_R$ so that the gain of the loop is a maximum, as indicated at $G_1$ of FIG. 5. As the frequency $\omega$ of small changes in the output voltage increases, the gain falls off because of the integration of $U_1$. This is done in order to prevent harmful interaction with load impedance. At the frequency $\omega_1$, the gain drops below unity.

Due to the resonance of $L_C$ and the capacitor 40, the gain has a peak at $\omega_2$. It is essential that the peak be below unity gain as otherwise the frequencies above the peak which are changed in phase by 180° would cause the loop to oscillate and all control would be lost.

Figure 3:
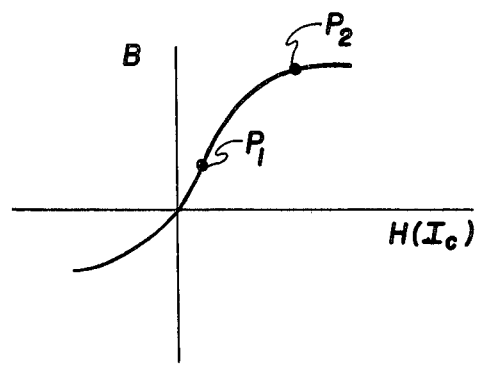
FIG. 3 is a graph of the hysteresis curve of a core that is common to the control and regulating windings of FIG. 1.

Under worst conditions, when the line voltage is a minimum and the load a maximum, the voltage at the junction J is low so as to increase $I_C$ and place the operating point at $P_2$ on the hysteresis curve of FIG. 3 where the slope is a minimum. The gain is reduced as indicated at $G_2$ of FIG. 5. As the frequency of small changes in output voltage increases, the gain falls off to intersect the line of unity gain at $\omega_3$, the frequency at which the power supply is rated. Thus, the frequency at which the power supply can regulate is strongly affected by operating conditions.

PREFERRED EMBODIMENT OF THE INVENTION

One difference between a power supply incorporating this invention and a power supply of the prior art lies in the nature of the drive circuit controlling the current in the control winding $L_C$. Instead of driving a current through $L_C$ that is proportional to the control voltage $V_C$, spaced pulses of voltage are applied across the control winding $L_C$ that have a net average time-voltage value that is inversely proportional to the control voltage $V_C$. Another difference is the provision of an inner servo loop within the outer servo loop.

Figure 6:
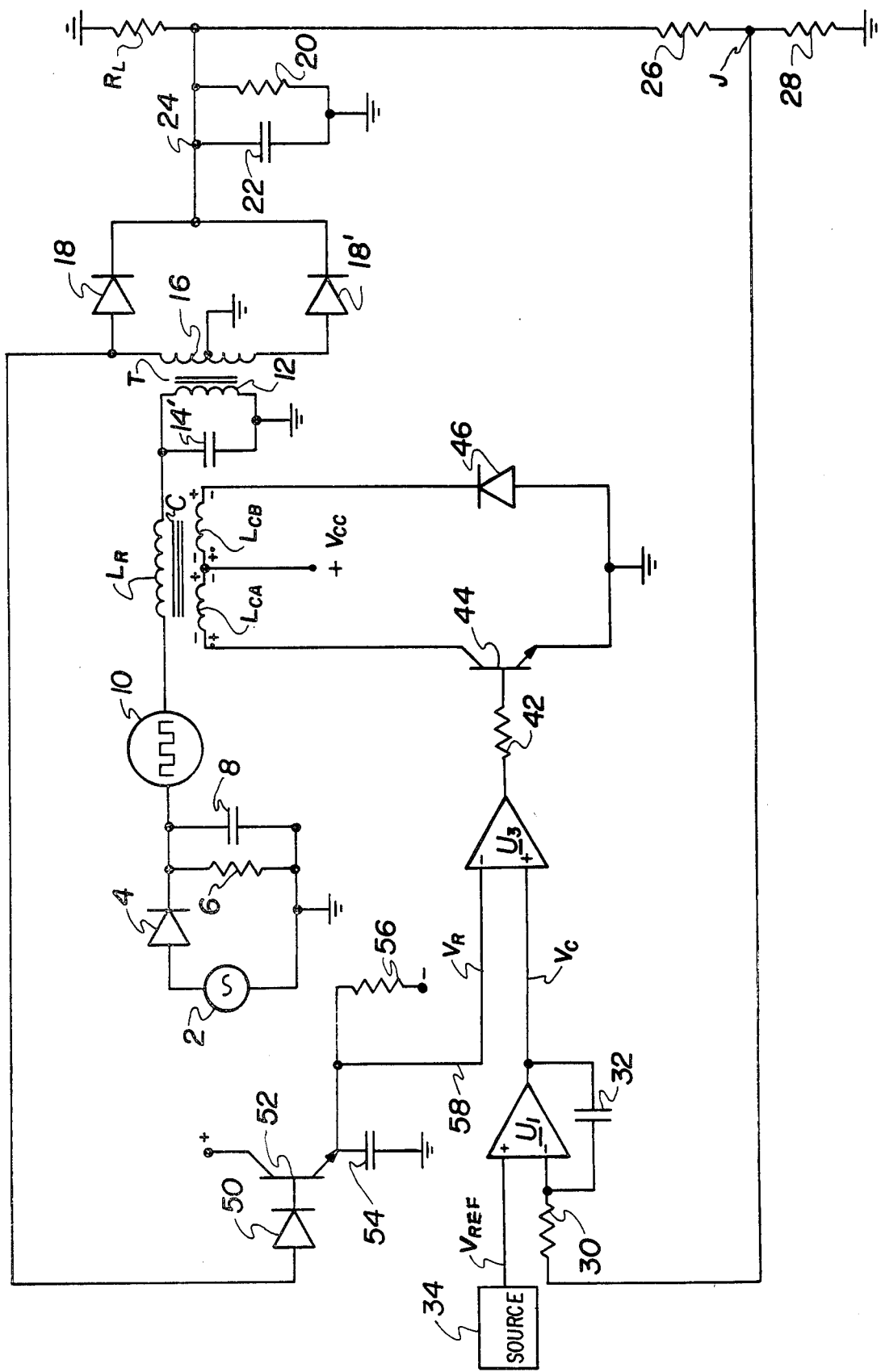
FIG. 6 is a schematic illustration of a preferred embodiment of a power supply incorporating the invention wherein synchronization of the pulse width modulator is attained with a voltage wave of the chopper frequency.

In FIG. 6, the components bearing the same designations as in FIG. 1 perform in the same way. Unregulated DC voltage provided by the diode 4 and its circuit is chopped by a chopper 10 that is connected in series with the regulating winding $L_R$ and the primary winding 12 of the output transformer T. A capacitor 14' bypasses the harmonics of the pulses provided by the chopper 10 so as to produce an essentially sinusoidal voltage across the primary winding 12. The desired DC output voltage is produced across the storage capacitor 22 by the full wave rectifier including the diodes 18 and 18'. Regulation is achieved by varying the inductance $L_R$ with current in a control winding having two halves, $L_{CA}$ and $L_{CB}$, that are wound on the same core C as $L_R$.

Feedback for an outer servo loop is from the junction J through $U_1$ to one input of an inner servo loop at the noninverting input of $U_3$. The inner servo loop is as follows. The output of $U_3$ is connected via a current limiting resistor 42 to the base of an NPN transistor 44. The emitter of the transistor 44 is connected to ground and the collector is connected via one-half, $L_{CA}$, of a control winding to a point of positive potential $V_{CC}$. The other half, $L_{CB}$, of the control winding is connected in series with a diode 46 between the same point of positive potential $V_{CC}$ and ground. Both halves, $L_{CA}$ and $L_{CB}$, of the control winding are magnetically coupled to the same core C as the regulating inductor $L_R$ and are respectively wound with the same sense. The sine waves of voltage at one end of the secondary winding 16 are peak detected so as to provide a voltage corresponding to the modulation thereof by connecting the secondary winding 16 to the anode of a diode 50 having its cathode connected to the base of an NPN transistor 52. If the voltage waves are not sufficiently sinusoidal, they can be made so by inserting an integration circuit, not shown. A capacitor 54 is connected between the emitter and ground, and the collector is connected to a point of positive potential. The capacitor 54 is charged to the peak value of the sinusoidal voltage at the upper end of the secondary winding 16 of the transformer T and is then discharged to a point below ground via a resistor 56 so as to produce a ramp voltage $V_R$ shown in FIG. 8B at the emitter that is conducted via a lead 58 to the inverting input of $U_3$, which is the other input of the inner loop.

OPERATION OF FIG. 6

Figure 8A:
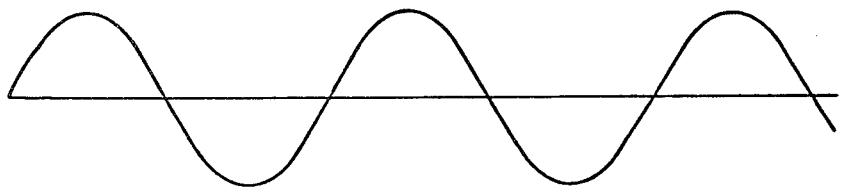
FIG. 8 includes a series of graphs 8A, 8B, 8C, 8D, 8E and 8F used in explaining the operation of the pulse width modulator used in the power supplies of FIGS. 6 and 9.

The operation of the power supply of FIG. 6 will now be explained with the aid of the graphs of FIGS. 8A through 8F in which the voltage across the upper half of the secondary winding 16 that is applied to the diode 50 is represented by the graph of FIG. 8A. Discharge of the capacitor 54 through the resistor 56 generates a ramp which is summed with the demodulated output voltage to form $V_R$. Changes in the control voltage $V_C$ and the detected output voltage will cause compensating changes in the voltage applied across $L_{CA}$ or $L_{CB}$. In this particular circuit, when $V_C > V_R$, the transistor 44 conducts so as to place the voltage $V_{CC}$ across $L_{CA}$.

Figure 8B:
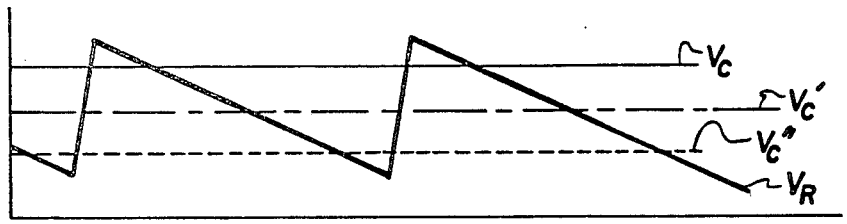

Assume that a sudden load is placed across the output of the power supply so that the voltage at the junction J drops and causes the control voltage $V_C$ at the output of $U_1$ to become more positive as indicated by the solid line $V_C$ in FIG. 8B. During $T_1$, FIG. 8C, $V_R$ is less than $V_C$ so that the output of $U_3$ is in a high state and causes the transistor 44 to conduct. This effectively grounds the outer end of $L_{CA}$ and places the voltage $V_{CC}$ across $L_{CA}$, as indicated in FIG. 8D, causing an increasing current to flow through it as indicated by the solid line 61 in FIG. 8E. This current induces a voltage equal to $V_{CC}$ across $L_{CB}$, as indicated in FIG. 8F, but because its polarity is as indicated by the + and − signs above $L_{CB}$, the cathode of the diode 46 is positive so that it cannot conduct.

Figure 8C:
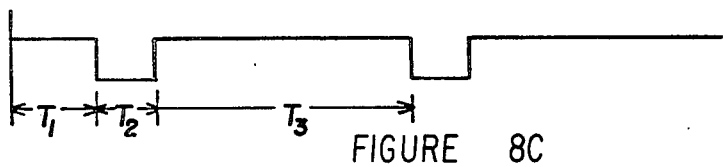
Figure 8D:
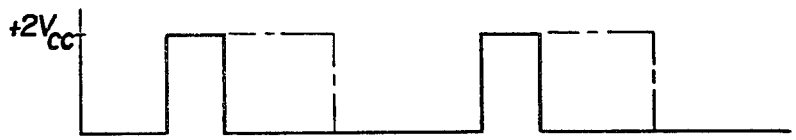
Figure 8E:
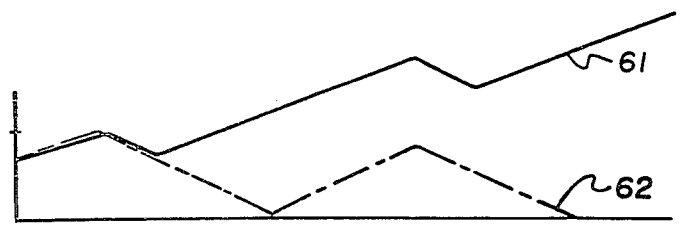
Figure 8F:
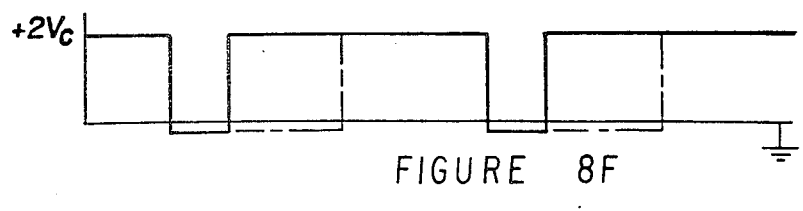

While the voltage ramp $V_R$ is greater than $V_C$, as during the period $T_2$ of FIG. 8C, the output of $U_3$ is low so as to cut off the transistor 44. The magnetic field built up by the current that flowed in $L_{CA}$ during the period $T_1$ then starts to collapse so as to induce voltages across $L_{CA}$ and $L_{CB}$ having the polarities indicated by the + and − signs under them. Because the transistor 44 is cut off, $L_{CA}$ is out of the circuit, but the voltage at the cathode of the diode 46 is enough negative with respect to ground, as shown in FIG. 8F, to equal the voltage drop across the diode 46 and cause a decreasing current to flow through the diode 46 during $T_2$ as indicated by a solid line 61 in FIG. 8E.

At the end of $T_2$, $V_R$ drops below $V_C$ so that the transistor 44 conducts once again. The current in $L_{CA}$ starts increasing from the last current value in $L_{CB}$, as shown by the solid line 61 because of the collapsing magnetic field and increases due to the application of $V_{CC}$ during a period $T_3$. This slewing up of the current in $L_{CA}$ and $L_{CB}$ places the core of $L_R$ at an operating point on its hysteresis curve having less slope so as to reduce the inductance of $L_R$ and increase the output voltage. The slewing up lasts for a number of cycles of the chopper 10. During this time, the voltage at the junction J increases so as to lower the control voltage $V_C$ to a value indicated by a dash-dot line $V_C'$ and equal the average value of $V_R$ if there are no circuit losses. Under this condition, as indicated by the dash-dot lines of graphs D and F, the transistor 44 and diode 46 will each conduct for half a cycle and the net volt-seconds of the voltages across $L_{CA}$ and $L_{CB}$ is zero. Should the output voltage increase, the voltage at the junction J increases so as to decrease $V_C$ to a level such as $V_C''$ indicated by the dashed line $V_C''$ in FIG. 8B, decrease the duration of the time of conduction of the transistor 44, decrease the volt-seconds of the voltage applied across the control windings $L_{CA}$ and $L_{CB}$, and increase the inductance of $L_R$.

From this explanation, it can be seen that the voltage ramp generator in combination with $U_1$ and $U_3$ operates as a pulse width modulator that periodically applies pulses of voltage across a control winding such as $L_{CA}$ having net volt-seconds that varies with the difference between the detected output voltage sidebands of the secondary winding 16 of the transformer T and the control voltage $V_C$.

In the power supply regulation control of FIG. 6, the rectangular pulses of voltage of varying width that are applied across $L_{CA}$ are synchronized with the chopping performed by the chopper 10. The time of occurrence of the pulses changes slightly depending on when $V_C$ and $V_R$ cross, but each is related to a particular cycle of the chopper. Whereas a separate source of pulses could be used having a frequency different from that of the chopper and having volt-seconds that depend on the difference between the detected voltage at the secondary 16 and $V_C$, this could introduce undesired frequencies, e.g., the beat frequencies with the chopper.

Figure 7:
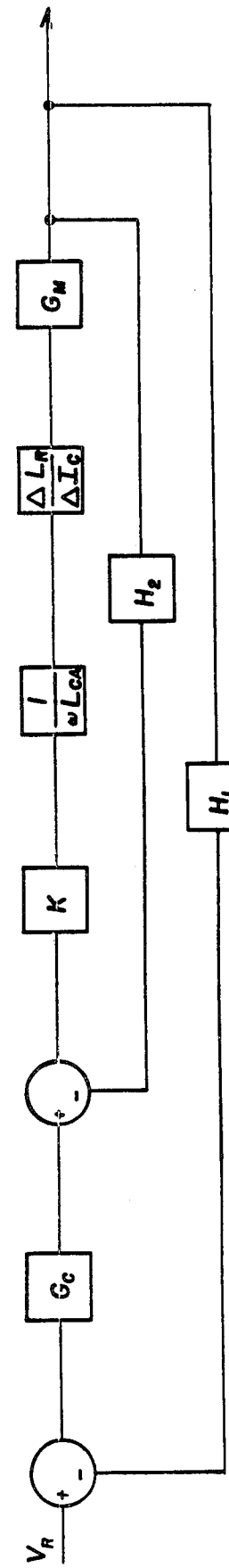
FIG. 7 is a block diagram illustrating the factors affecting gain of the power supply of FIG. 6.

Reference is now made to FIG. 7 which illustrates the various factors affecting the gain of the power supply of FIG. 6. Comparison with FIG. 2, which illustrates the factors affecting the gain of a power supply of the prior art, shows that FIG. 7 additionally includes a term K representing the pulse width modulator transfer characteristic which can be represented as a pure gain over the frequencies of interest. This factor is inversely related to the slope of the ramp $V_R$. Larger amplitude ramps require a greater change in $V_C$ to achieve the same pulse width change. As will be discussed in connection with FIG. 9, the peak to peak amplitude of the ramp can be changed to control the gain of the inner loop as a function of other circuit parameters. Missing from FIG. 7 is the factor $1/R(\omega^2 L_C C + 1)$ because a capacitor such as 40 of FIG. 1 is not required for the reason that the impedance of the voltage drive including the transistor 44 and the diode 46 is low.

Of great importance is the factor $1/\omega L_{CA}$. It will be remembered that, as was discussed in connection with FIG. 5, the factor $\Delta L_R/\Delta I_C$ was directly proportional to the slope of the hysteresis curve at the operating point so that the frequency in the output voltage that could be followed varied with operating conditions. Since the values of $L_{CA}$ and $L_{CB}$ change in a like manner with the slope of the hysteresis curve, the effect of the change in $\Delta L_R/\Delta I_C$ is cancelled out and the gain vs frequency characteristic is as indicated by a curve 60 in FIG. 5.

FIG. 7 also illustrates the two servo loops of FIG. 6, an inner loop formed by the feedback indicated by $H_2$ of the voltage from the secondary winding 16 of the transformer T to the diode 50 and eventually to the inverting input of $U_3$, and an outer loop formed by the feedback indicated by $H_1$ of the voltage at the junction J to $U_1$ and connection of its output to the non-inverting input of $U_3$. For any given value of the control voltage $V_C$, the inner loop will regulate the voltage at the secondary winding 16 and the outer loop regulates the output voltage at 24 by the voltage $V_C$ applied to the inner loop. In order to avoid oscillations, the speed of the inner loop is greater than that of the outer loop. Another way of looking at it is to note that the inner loop is the agency through which the outer loop regulates.

ADVANTAGES OF THE INVENTION

Power dissipation in the driver is minimal. Since the transistor 44 is either full on or full off, the only losses occur from $(V_{CE,SAT})i_C$ in the switching transistor 44 and losses through the diode 46. The average current drawn from the supply $TV_{CC}$ will be the amount required to supply these losses.

The impedance presented to the back coupling current in the preferred embodiment is minimal. This eliminates the need for a capacitor in shunt with $L_{CA}$ or $L_{CB}$ as in the prior art and avoids the resulting lag in the overall response to transients.

Line voltage related disturbances are regulated by two loops. For a 100 HZ line disturbance, this would mean that if both loops have a 1 KHz single pole roll-off that there would be a 40 db rather than 20 db rejection ratio.

A power supply having inner and outer loops in accordance with the invention has a wider bandwidth response under all operating conditions.

A power supply incorporating this invention can easily vary gain with some parameter by varying the conduction of the transistor 52 to change the height of the ramp $V_R$.

ALTERNATIVE EMBODIMENT

Figure 9:
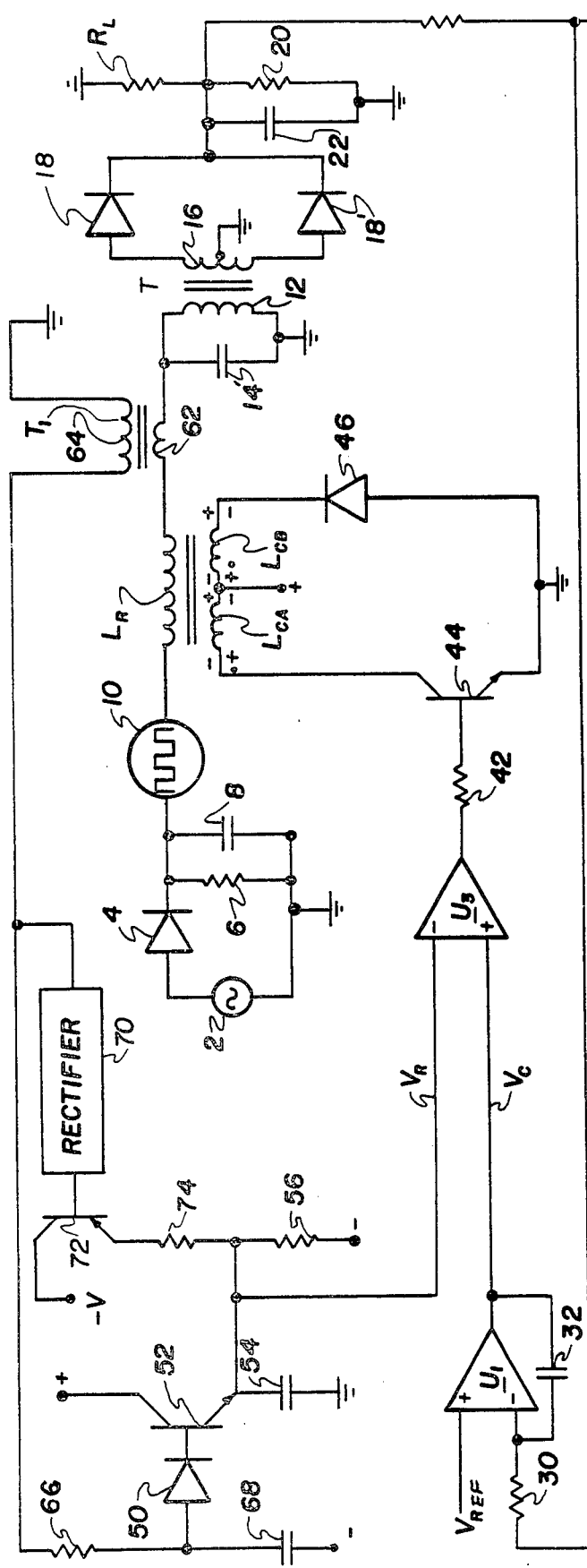
FIG. 9 is a schematic illustration of a power supply of the invention wherein the synchronization of the pulse width modulator is with the current in the regulation winding.

Instead of feeding the AC voltage at the output transformer to a peak detector and coupling the peak detector to a voltage ramp generator, as in FIG. 6, the voltage applied to the peak detector can be derived from the current flowing through $L_R$ as indicated in FIG. 9. Except for this and a circuit to be described for varying the amplitude of the ramp $V_R$, FIG. 9 is the same as FIG. 6. A current transformer $T_1$ is provided having a primary winding 62 connected in series with $L_R$. If the current is triangular in shape, as with some forms of choppers 10, it is converted into a sine wave by grounding one end of a secondary winding 64 of $T_1$ and connecting the other end to ground via a series resistor 66 and capacitor 68 that form an integrator and connecting their junction to the anode of the diode 50. If, on the other hand, the current is sinusoidal, the ungrounded end of the secondary winding 64 may be connected directly to the anode of the diode 50.

The main difference between this embodiment of the invention and that of FIG. 6 is that the inner loop regulates the current in $L_R$ rather than the voltage across half of the secondary winding 16 of the output transformer. For this reason, it is not as stiff a controller of output voltage.

FIG. 10, illustrating the factors affecting the gain of both loops, is the same as FIG. 7 except for the fact that the transfer function $G_M$ is divided into two parts: $G_{M1}$ which represents the transformation of a change in $L_R$ into a change in the current $I_R$ passing through it; and $G_{M2}$ which represents the change in output voltage that occurs as a result of a change in $I_R$. The return for the inner loop is from the output of $G_{M1}$.

As previously mentioned, it is sometimes desirable to vary the amplitude of the ramp $V_R$ provided at the emitter of the transistor 52 in accordance with some variable. By way of example, the amplitude of the ramp $V_R$ is changed in FIG. 9 in accordance with the current $I_R$ passing through the regulating inductor $L_R$ by coupling a rectifier 70 between the ungrounded end of the secondary winding 64 of the transformer $T_1$ and the base of a PNP transistor 72. The collector is connected to $-V$ and the emitter is connected via a resistor 74 to the emitter of the transistor 52. Thus, as $I_R$ increases, the output of the rectifier 70 becomes more negative so as to increase the amplitude of $V_R$.

FIG. 11 illustrates an embodiment of the invention in which the voltage across $L_C$ is continuous rather than pulsed. Unregulated DC voltage supplied by the diode 4 is chopped in a chopper 10 so as to produce pulses of DC current through the regulating inductor $L_R$ and the primary winding 12 of the transformer T. DC output voltage may be provided at the output terminal 24 by diodes 18 and 18' and is regulated by changing the inductance of $L_R$. The drive circuit for controlling the inductance of $L_R$ is as follows. The inverting input of a differential amplifier $U_4$ is connected via a resistor 74 to the output of $U_1$ and by a resistor 76 to its own output, and the non-inverting input is connected via a switch s directly to the junction J. The output of $U_4$ is connected to the base of a PNP transistor 78 having its collector connected to a point having a voltage $-V$ and its emitter connected via the control winding $L_C$ to a point having a voltage $+V$. The capacitor 40 may be placed in shunt with $L_C$, as in FIG. 1, so as to provide a circuit for dissipating the energy of chopper frequency coupled into $L_C$ from $L_R$.

It can be seen that the drive circuit just described continuously applies a voltage across $L_C$ proportional to the difference between a control voltage $V_C$ and the output voltage which is in effect the detected voltage across the output transformer T, and that the gain factors are as depicted in FIG. 7 wherein $H_2$ is unity because the voltage at J is applied directly to $U_4$. When $V_C$ is very small, the output of $U_4$ is highly positive so as to make the impedance of the collector-to-emitter path of the transistor 78 have a maximum value, reduce the voltage across $L_C$ to a minimum and make $L_R$ have a maximum inductance. If the output voltage of the power supply should drop, $V_C$ becomes greater, the output of $U_4$ moves in a negative direction, the transistor 78 conducts more heavily, and the voltage across $L_C$ is increased. This increases the current in $L_C$, thereby decreasing the inductance of $L_R$ as desired.

FIG. 11 can easily be adapted to dispose of the inner loop and its consequent advantages by connecting the switch s to ground as indicated by the dashed line. Thus, the voltage across $L_C$ is proportional to $V_C$ which is related to the difference between the output voltage and the desired output voltage. The speed of response remains about the same and is not affected by operating conditions, but the control is more susceptible to noise and variations in components.

FIG. 12 illustrates a form of multivibrator that could be coupled to the output of the amplifier $U_3$ in either FIG. 6 or FIG. 9 so as to control the voltage across a control winding $L_C$. The output of $U_3$ is connected via a resistor 80 to the base of an NPN transistor 82 and via a resistor 84 to the base of an NPN transistor 86. A diode $D_1$, a control winding $L_C$ and a diode $D_2$ are connected in series in the order named between a point of positive DC voltage $+V$ and a point of negative DC voltage $-V$, the diodes both being poled so as to block the flow of current between these points. The collector of the transistor 82 is connected to the junction of the diode $D_1$ and the control winding $L_C$ and its emitter is connected to the point of $-V$ voltage. The emitter of the transistor 86 is connected to the point of $-V$ voltage, and its collector is connected via series resistors 88 and 90 to the point of $+V$ voltage. The collector of a PNP transistor 92 is connectd to the junction of $L_C$ and $D_2$, its emitter is connected to the point of $+V$ voltage and its base is connected to the junction of the resistors 88 and 90.

When the output of $U_3$ is positive, the transistors 82 and 86 are turned on, as is the transistor 92, with the result that current flows from the point of $+V$ voltage through the transistor 92, up through the control winding $L_C$ and through the transistor 82 to the point of $-V$ voltage. During this time, the diodes $D_1$ and $D_2$ do not conduct, but when the output of $U_3$ is negative, all the transistors are cut off, with the result that the collapse of the magnetic field associated with the control winding $L_C$ causes current to flow through the diodes $D_1$ and $D_2$.

SUMMARY

In FIG. 6, the peak detector formed by the diode 50, transistor 52 and capacitor 54 peak detects the amplitude variations of the chopper frequency across the secondary winding 16. The voltage across the primary winding could be detected instead. The ungrounded side of the capacitor 54 is one input of a means including $U_3$, transistor 44, $L_{CA}$, $L_{CB}$ and the diode 46 for applying a voltage across the control winding, $L_{CA}$ and $L_{CB}$, having a volt-second product proportional to the difference between the detected amplitude variation and a voltage control signal $V_C$ applied to the non-inverting input of $U_3$. The voltage control signal is the difference between a reference voltage $V_R$ corresponding to a desired output voltage and the voltage at the junction J which corresponds to the actual output voltage.

In FIG. 9, the amplitude variations in current in the primary winding 12 of the transformer T are converted to voltage variations by the current transformer $T_1$ and the amplitude modulation is detected by the peak detector comprised of the diode 50, transistor 52 and capacitor 54. The current in the secondary winding 16 could be used as well.

In the power supplies of FIGS. 6 and 9, a particular form of pulse width modulator is employed, but other forms, such as that illustrated in FIG. 12 could be used. These modulations are synchronized with the chopper frequency by generating the ramp $V_R$ during each cycle and applying pulses of voltage across the control winding, herein comprised of $L_{CA}$ and $L_{CB}$ having a volt-time product proportional to the difference between the detected amplitude variation and the control signal $V_C$. The change in the detected amplitude produced during one cycle of the chopper may not make the average value of the detected signal, i.e., the average value of the ramp $V_R$, equal to the control signal $V_C$ but this will occur after a number of cycles until the net volt-seconds of the voltage across the control winding is zero or nearly so if losses are considered. Thus, for example, any noise that modulates the voltage or current of chopper frequency will be attenuated by the inner loop before it reaches the load and therefore wont have to appear in the load before it can be attenuated, as would be the case in the prior art.

The power supply in FIG. 11 differs from those illustrated in FIGS. 6 and 9 in that the voltage applied across the control winding is continuously proportional to the difference between the control signal $V_C$ and the voltage modulation of the chopper frequency as detected by the rectifiers 18 and 18'. Although not shown, some means would be provided to compensate for the phase lag caused by the low pass filter 20, 22.

FIG. 11 also illustrates, when the switch s is connected to ground, a power supply in which the inner servo loop is eliminated but which retains the advantage of applying a voltage across the control winding $L_C$ so that the response to variation in line voltage or load is not affected by operating conditions due to changes in $\Delta L_R / \Delta I_C$.

It will be apparent that the AC at the transformer T is regulated and could be used if desired, and further that the power supply could be used to regulate output current by deriving the control voltage $V_C$ from the difference between a reference voltage for current and a voltage corresponding to the current. In this case, the output voltage is controlled so as to make the output current constant.

What is claimed is:

1. A power supply comprising
a source of voltage pulses, a regulating inductor wound on a core, a transformer having primary and secondary windings, said source, said regulating inductor and said primary winding being coupled so as to produce voltage variations across said secondary winding having an amplitude determined by the inductance of said regulating inductor,
rectifying means coupled to said secondary winding so as to produce an output parameter,
a source of reference signal corresponding to a desired value of said output parameter,
means for deriving a parameter control signal corresponding to the difference between the output parameter provide by said rectifier and said reference signal,
demodulation means for detecting the amplitude modulation of the voltage across one of said primary and secondary windings of said transformer,
a control winding wound on said core, and
means for controlling the current in said control winding in response to the difference between the output of said demodulation means and said parameter control signal.

2. A power supply, comprising
a source of voltage pulses, a regulating inductor wound on a core, a transformer having primary and secondary winding, said source, said regulating inductor and said primary winding being coupled so as to produce voltage variations across said secondary winding having an amplitude determined by the inductance of said regulating inductor,
rectifying means coupled to said secondary winding so as to produce an output parameter,
a source of reference signal corresponding to a desired value of said output parameter,
means for deriving a parameter control signal corresponding to the difference between the output parameter provided by said rectifier and said reference signal,
demodulation means for deriving a voltage corresponding to the detected amplitude modulation of the current in one of said primary and secondary windings of said transformer,
a control winding wound on said core, and
means for controlling the current in said control winding in response to the difference between the output of said demodulation means and said parameter control signal.

* * * * *